3,337,769
THREE PHASE CONTROLLED POWER SUPPLY FOR A DIRECT CURRENT ARC WELDING SYSTEM
John K. Buchanan, Charlottesville, Va., assignor, by mesne assignments, to Harnischfeger Corporation, West Milwaukee, Wis., a corporation of Wisconsin
Filed Apr. 21, 1965, Ser. No. 449,737
8 Claims. (Cl. 315—142)

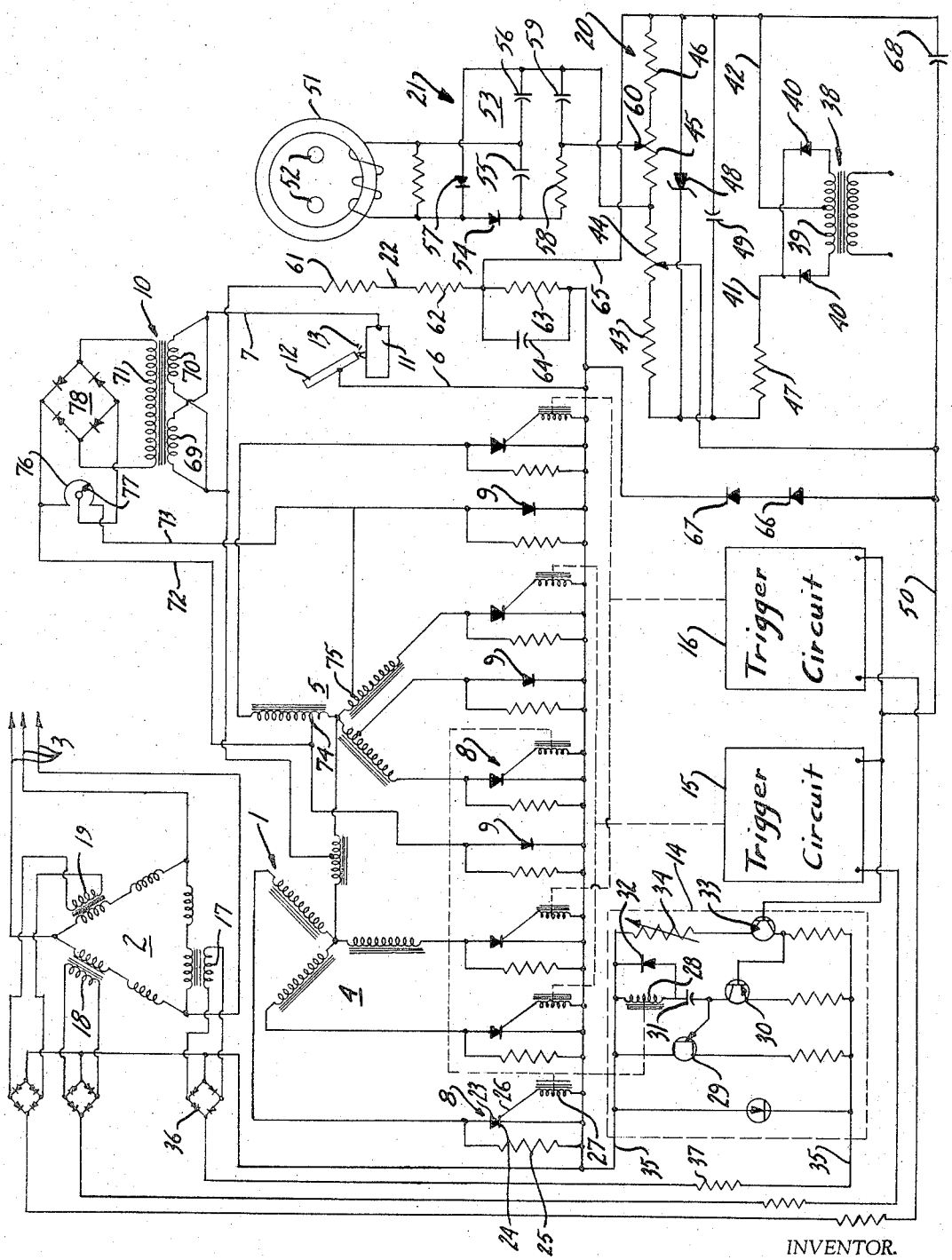

This invention relates to an arc power source and particularly to a direct current (D.C.) arc power source for establishing and maintaining an arc between a pair of spaced electrodes; for example, as in arc welding.

In direct current arc power supplies, suitable transformers may be provided to reduce the incoming line voltage to a selected voltage suitable for establishing and maintaining the arc. The output of the transformer is rectified by suitable full wave rectification means to provide a direct current output. A highly satisfactory arc welding supply is disclosed in the copending application of Bernard J. Aldenhoff et al. entitled, Arc Power Supply, which was filed on Apr. 7, 1964, with Ser. No. 357,936. In that application, the output of a polyphase welding transformer is connected through a pair of welding secondaries to the output lines with each phase being connected in series with a silicon controller rectifier. The current and voltage control is obtained by selectively phasing or firing of the silicon controlled rectifiers to change the portion of the voltage wave impressed across the arc. Although the pulsating effect which results in the wave shape of the welding current would normally suggest that the power source was unsuitable for establishing and maintaining arcs, the above applicants discovered a completely satisfactory welding circuit or power supply is provided particularly by employing a suitable inductance or other smoothing means. In order to provide optimum control, the several silicon controlled rectifiers are actuated through unijunction timing circuits energized from a reference source including a phase shifting network. Additionally, the input to the timing modules includes a transistor signal control interconnected to the output of the welding circuit to provide slope control, voltage control and the like.

The present invention is particularly directed to an arc power supply employing a polyphase circuit with silicon controlled rectifiers connected in the output circuit as disclosed in the aforementioned application to provide a rectified direct current output suitable for triggering or establishing and maintaining a load. The present invention particularly provides an improved triggering means including means for energizing of the triggering modules and controlling of the precise firing point.

In accordance with the present invention, the triggering modules generally employ a unijunction timing circuit. A capacitor is charged through a circuit including a transistor to determine the precise firing of a unijunction transistor and therefore the silicon controlled rectifiers. In accordance with the present invention, each of the timing modules is energized from a power source including a winding wound directly on the main transformer with the output full wave rectified and applied to the timing circuit. This eliminates requirement for phase shifting between the triggering and the main voltage wave and permits prealignment of the various modules so that they can be employed in an interchangeable manner within the circuit with substantial reduction in the cost of the system. Additionally, a stabilized arc sensing voltage system includes a voltage divider connected to sense the arc voltage and interconnected with a reference voltage having a floating reference connection. A limiter is interconnected between the arc sensing circuit and the output of the feedback signal to limit the voltage which can be impressed on the trigger circuit. This has been found to stabilize the operation of the trigger circuit and in particular prevents overdriving of the circuit and premature firing of the rectifiers.

The present invention thus provides a silicon controlled direct current power supply having an improved stabilized triggering means suitable for commercial production for establishing and maintaining a stable arc such as required for welding including the recently developed low amperage arc system.

The drawing furnished herewith illustrates a preferred construction for carrying out the invention in which the above advantages and features are clearly illustrated as well as others which will be clear from the drawing and the description thereof.

The drawing is a schematic circuit diagram of a welding power source incorporating the present invention for establishing and maintaining a highly stable welding arc.

The illustrated embodiment of the invention includes a three phase welding transformer 1 having a three phase delta connected primary 2 interconnected to suitable three phase incoming power lines 3. A pair of Y-connected secondaries 4 and 5 is wound on a common core structure, shown diagrammatically, with the primary winding 2 to provide similar magnetic coupling and peak output voltages in the illustrated embodiment of the invention. The output of each of the transformer secondaries 4 and 5 is similarly connected between a pair of direct current output leads 6 and 7 with each phase being connected in series with a corresponding silicon controlled rectifier 8 and polarized such that lead 6 is positive and lead 7 is negative. Sustaining diodes 9 are connected in parallel with the silicon controlled rectifiers 8 and a portion of the corresponding phase windings of the secondary 5 generally in accordance with the teaching of the copending application of Bernard J. Aldenhoff entitled Direct Current Power Supply which was filed on July 1, 1964 with Ser. No. 379,492 and which is assigned to the same assignee as the present application. A saturable reactor 10 is connected in series with the output lead 7. A work member 11 is connected to lead 7 and an electrode 12 is connected directly to the positive output terminal or lead 6. The electrode 12 may be a consumable electrode unit adapted to be continuously fed to the work 11 with an arc 13 established and maintained therebetween to continuously deposit the electrode onto the work in accordance with any well known direct current welding processes or the like. In order to control the voltage impressed on the arc 13, the firing of silicon controlled rectifiers 8 is similarly controlled through suitable and similar triggering circuits 14, 15 and 16, of which only 14 is shown and described in detail, for the related phase windings of the transformer secondaries 4 and 5. The related windings of secondaries 4 and 5 conduct the alternate half cycle to produce a full wave rectified output between the leads 6 and 7.

In accordance with the illustrated embodiment of the invention, the triggering circuits 14, 15 and 16 are similarly energized from corresponding secondary windings 17, 18 and 19 of the transformer 1 as hereinafter described to vary the proportion of the wave applied to the arc. The actual firing point within each half cycle of the voltage wave of the secondaries 4 and 5 or the phasing back of the corresponding silicon controlled rectifiers 8 in each of the branches is established by a control circuit including a reference voltage circuit 20 providing an adjustable output signal which is modified by a slope control or phase current sensing circuit 21 and an arc voltage sensing circuit 22.

Generally, the operation of the present invention is similar to that disclosed in the first identified application Ser. No. 357,936. Completion of the connection of the transformer primary 2 to the incoming power lines 3 provides an alternating current output from the transformer secondaries 4 and 5 of a suitable reduced voltage and power level for proper establishing and maintaining the arc 5 after rectification. The silico ncontrolled rectifiers 8 which individually interconnect each phase to the D.C. output lines or leads 6 and 7 rectify the alternating current to a three phase full wave output with each pair of the phase related rectifiers 8 fired to conduct during the corresponding half cycles and conducting when the rectifier anode is positive with respect to its cathode, in accordance with known functioning. The precise magnitude of the average output voltage impressed on the electrode 12 and the work 11 to establish and maintain the arc 13 will be determined by the firing point in the half cycle of the voltage applied to the silicon controlled rectifiers 8. This in turn is determined by the output of the triggering circuits 14, 15 and 16 which derive their power from the main transformer 1 through the windings 17–19, inclusive. The reference circuit 20 is preset to establish a firing pulse in accordance with the desired output voltage. Thus, if maximum voltage is desired, each silicon controlled rectifier 8 is fired to essentially apply the full half wave to the arc. If a lesser voltage is desired the reference circuit energizes the trigger circuits 14, 15 and 16 to phase back the firing of the corresponding silicon controlled rectifiers 8 and therefore apply only a portion of each voltage pulse or half wave from the corresponding secondary to the power leads 6 and 7. The slope control circuit 21 senses the current in a given phase of the output secondaries 4 and 5 and modifies the reference signal to maintain a predetermined slope characteristic. The arc sensitive circuit 22 senses the average arc voltage and modifies the reference signal to maintain a relatively stable arc characteristic by increasing or decreasing the firing point of the silicon controlled rectifiers if the arc voltage varies from the reference.

More particularly, in the illustrated embodiment of the invention, silicon controlled rectifiers 8 are well known devices and only the one actuated by circuit 14 is described. The rectifier includes an anode 23 connected to the terminal end of the corresponding secondary phase winding and a cathode 24 connected to the positive power lead 6. A stabilizing resistor 25 is connected in parallel across the main power terminals of the silicon controlled rectifier 8. A gate 26 of the rectifier 8 is connected to the corresponding triggering circuit 14 through a pulse transformer having a secondary 27 connected to gate 26 and a primary 28 connected as the output of the corresponding triggering circuit 14.

The illustrated triggering circuit 14 corresponds to the triggering circuit shown in the previously identified copending application Ser. No. 357,936 and generally includes a unijunction transistor 29 connected in parallel with a series circuit including a controlled transistor 30, a firing capacitor 31 and the primary winding 28 of the pulse transformer. A diode 32 is connected in parallel to the winding 28 to conduct during charging of the capacitor 31. A control transistor 33 is connected in series with a variable resistor 34 and in parallel with the above circuits between a pair of direct current input lines 35 to provide an adjustable voltage dividing network having the output connected to the input of the transistor 30. Lines 35 are connected to the corresponding secondary control winding 17 through a full wave bridge rectifier 36 of a well known construction. One side of the circuit connected to line 35 includes a load resistor 37. Thus, the D.C. power fed to the triggering circuit 14 charges the capacitor 31 to a level to fire the unijunction transistor 29 which rapidly discharges through the pulse transformer primary 28. In the present invention, the power fed to the trigger circuit 14 is maintained in precise phase relationship with the phase of the circuit being controlled as a result of the direct connection of the winding 17 on the main transformer 1 and eliminates any necessity for phase shift to maintain reliable constant operation in response to the control effected by circuits 20 to 22, inclusive, as presently described. Further, the trigger circuits are preferably constructed as individual modules and practically will include components with tolerances as to values. The resistor 34 can be adjusted to compensate for the tolerance effect on operation so they all appear identical and are thus interchangeable. In contrast, where a phase shift circuit is employed, the tolerance of the components in these circuits requires further adjustment of the resistor.

The reference circuit 20 includes a control transformer 38 having a center tapped secondary 39 to provide a suitable voltage for controlling the triggering circuits. Rectifiers 40 are connected one each to the opposite end of the center topped secondary 39 and are oppositely polarized to conduct with respect to a common output lead 41. The opposite output lead 42 is connected to the center tap of the transformer secondary 39. A voltage dividing network consisting of resistors 43, 44, 45 and 46 are connected directly across the output leads 42 and 41 with a resistor 47 inserted in lead 41. A Zener diode 48 is connected across the voltage dividing network to maintain a constant reference voltage across the voltage dividing network. A filter capacitor 49 for the reference voltage dividing network is connected across Zener diode 48. Its purpose is to filter and maintain a constant D.C. potential at the value of the Zener voltage of diode 48. Resistor 44 is a 10 turn helicoil potentiometer having an output tap connected to a common signal line 50 for the several circuits 14–16. Line 50 is connected as the control input to the transistors 32 of the several triggering cricuits 14, 15, 16 and biases the transistors 32 to a similar conduction level. Transistor 39 serves as an amplifier and provides an amplified signal to the input of transistors 30 to control the conduction therethrough. In this manner, the current supply to the capacitor 31 is controlled and the time constant of the capacitor circuit is controlled. As the reference voltage at line 50 varies, the conduction of the transistors 32 and 30 varies to change the charging time of the capacitor 31 and therefore the timing of the firing of the silicon controlled rectifiers 8.

The reference voltage is preset by the potentiometer tap 49 and modulated by the signals of the slope control circuit 21 and the arc sensitive voltage circuit 22, as follows.

The slope control circuit 21 includes a current transformer 51 coupled to a pair of the phase leads 52 generally as described in the previously identified application Ser. No. 357,936. The output of the transformer 51 however in this circuit is connected across a voltage doubler network 53 including a first conductive path serially including a diode 54 and a capacitor 55 for charging the capacitor 55 with the left side positive during one half cycle. During the alternate half cycle, current flows from the opposite side of the transformer 51 through a capacitor 56 and a diode 57 back to the opposite side of the transformer. Conduction through the capacitor 55 and diode 54 is blocked by the latter. As a result, each of the voltage pulses is rectified and generates a corresponding voltage across the capacitors 53 and 54. A resistor 58 and a capacitor 59 are connected across the capacitors 53 and 54 to provide an output voltage double that of the transformer 51. Resistor 45 of the voltage dividing network is a potentiometer having a tap 60 connected to the junction of the resistor 58 and the capacitor 59 and provides a voltage signal which is connected in the reference voltage dividing branch with an opposite polarity of the reference voltage to back bias the circuit in accordance with the phase current. The illustrated slope control circuit 21 provides improved operation particularly when employed in connection with a triggering circuit such as employed as shown at 14. The increased output voltage of the doubler circuit 53 provides a reference voltage of the order of a proper magnitude. Additionally, the use of a single pair of rectifiers 52 and 55 in contrast to the usual full wave rectifying circuit reduces the diode voltage drop in the circuit and thus minimizes the voltage losses. This also contributes to the satisfactory use of a current transformer in a single phase of the welding transformer 1.

As the circuit is sensitive to current flow and produces a regulated output voltage with respect to this current flow, a variable slope control is provided by the use of the tap 60 on resistor 45.

Additionally, the voltage sensitive circuit 22 modifies the signal applied to the triggering circuits and thereby further stabilizes the arc characteristic, as follows.

In the illustrated embodiment of the invention, the arc sensitive circuit 22 includes three resistors 61, 62 and 63 connected in parallel between the output leads 6 and 7, with the one connection being made to the transformer side of the inductor 10 which eliminates or reduces the effects of transients in the arc 13. A small capacitor 64 is connected across the resistor 63 to further filter erratic arc voltages and maintain a relatively constant reference. However, capacitor 64 has a relatively small capacitance which does not significantly affect the operation of the circuit. An output signal line 65 connects the junction of the resistors 62 and 63 to the reference power lead 42 to provide a free floating circuit connection completed through the resistors 46, 45, 44, tap 49 and back to lead 6 through a pair of diodes 66 and 67 connected between lead 50 and lead 6.

In electronic triggering circuits employing transistors and the like, the total magnitude of the control signal fed to the circuit becomes significant. Thus, if an abnormally large signal is applied to the transistor 31 of the trigger circuit 14, it will be overdriven and cause premature firing of the silicon controlled rectifier 8. The diodes 66 and 67 act as a limiter circuit having approximately three-fourths of a volt drop across each diode to limit the maximum voltage which can be applied to the trigger circuits 14, 15 and 16 to one and one-half volts. This also has been found to provide an improved operation with elimination of premature firing of the silicon controlled rectifiers 8.

A capacitor 68 is also connected directly between lead 42 and the signal lead 50 to control the arc time response and to maintain a relatively high starting voltage for initial striking of the arc 13.

As previously noted, the voltage sensitive circuit 22 is connected across the output leads to the transformer side of the inductor 10 to maintain a relatively constant reference voltage. The inductor 10 is an adjustable element to permit adjustment of the circuit for various welding processes and the like. In the illustrated embodiment of the invention, a saturable reactor type control is shown including a pair of oppositely wound inductor windings 69 and 70 connected in parallel with each other in the lead 7. A D.C. winding 71 is magnetically coupled to the windings 69 and 70 in accordance with known practice to provide saturation of the coupling core and therefore controlling the inductance of the windings 69 and 70. In accordance with the present invention, the D.C. winding 71 is energized through a direct current power source taken directly from the secondary 5 in the following manner.

D.C. leads 72 and 73 are connected respectively to taps 74 and 75 on any two of the three windings of secondary 5 and in particular are connected to the taps corresponding to the connectoin of the sustaining diodes 9 to provide a corresponding single phase voltage input as a part of the D.C. control circuit. A potentiometer 76 is connected across the leads 72 and 73 and includes an adjustable tap 77 for selecting any portion of the input voltage. A full wave rectifier 78 has its input terminals connected across the tap 77 of the one side of the potentiometer 76 and has its output terminals connected directly across the winding 71 to provide an adjustable D.C. energization thereof and a resulting control of the inductance of windings 69 and 70.

Various modes of carrying out the invention are contemplated as being within the scope of the following claims particularly pointing out and distinctly claiming the subject matter which is regarded as the invention.

I claim:

1. In an arc welding system for supplying a direct current to a welding arc struck between a pair of spaced electrode means, a polyphase transformer having a plurality of secondary phase windings and having control source windings wound one in common with each phase winding, a plurality of rectifying means connected one each in series with each phase winding and defining a pair of direct current output terminals for connection to the electrode means, said rectifying means being normally nonconducting and having an external firing terminal for receiving an input signal and effective to cause the rectifying means to be conductive, firing means having a storage means and a discharge circuit including the firing terminal and a charging rate control means to cause said rectifying means to fire at a selected position in a half cycle of alternating secondary winding voltages, a rectifying means connected to the control source windings and the storage means for charging thereof to a preselected value and discharging through said discharge circuit, and adjustable control means connected to the charging rate control means to preset the firing position in each half cycle.

2. In an arc welding system for supplying a direct current to a welding arc struck between a pair of spaced electrode means, a polyphase transformer having a plurality of secondary phase windings and control source windings wound one in common with each phase winding, a plurality of rectifying means connected one each in series with each phase winding and defining a pair of direct current output terminals for connection to the electrode means, said rectifying means being normally nonconducting and having an external firing terminal responsive to an input signal to cause the rectifying means to be conductive, firing means having a storage means and a discharge circuit including the firing terminal and a charging rate control means to cause said rectifying means to fire at a selected position in a half cycle of alternating secondary winding voltages, a rectifying means connected to the control source windings and the storage means for charging thereof to a preselected value and discharging through said discharge circuit, adjustable control means including a reference circuit and an arc sensitive circuit connected in opposition and having an output lead connected to the charging rate control means, a composite control signal being formed at the output lead, and signal limiting means connected to the output lead to limit the maximum output signal from said control means.

3. In an arc welding system for supplying a direct current to a welding arc struck between a pair of spaced electrode means, a polyphase transformer having a plurality of secondary phase windings, a plurality of rectifying means connected one each in series with each phase winding and defining a pair of direct current output terminals for connection to the electrode means, said rectifying means being normally nonconducting and having an external firing terminal responsive to an input signal to cause the rectifying means to be conductive, firing means having a storage means and a discharge circuit including the firing terminal and a charging rate control means to cause said rectifying means to fire at a selected position in a half cycle of alternating secondary winding voltages, a reference control circuit including a voltage dividing circuit elements connected at opposite ends to a direct current source and a voltage regulating means to establish a preset voltage drop across the voltage dividing circuit elements, and an arc sensitive circuit including voltage dividing circuit elements connected across the output terminals and an intermediate connection connected to one end of the first named voltage dividing circuit elements.

4. In an arc welding system for supplying a direct current to a welding arc struck between a pair of spaced electrode means, a polyphase tranformer having a plurality of secondary phase windings and control source windings wound one in common with each phase winding, a plurality of rectifying means connected one each in series with each phase winding and defining a pair of direct current output terminals for connection to the electrode means, said rectifying means being normally nonconducting and having an external firing terminal responsive to an input signal to cause the rectifying means to be conductive, firing means having a storage means and a discharge circuit including the firing terminal and charging rate control means to cause said rectifying means to fire at a selected position in a half cycle of alternating secondary winding voltages, a rectifying means connected to the control source windings and the storage means for charging thereof to a preselected value and discharging through said discharge circuit, a reference control circuit including voltage dividing circuit elements connected at opposite ends to a direct current source and a voltage regulating means to establish a preset voltage drop across the voltage dividing circuit elements, and an arc sensitive circuit including voltage dividing circuit elements connected across the output terminals and having an intermediate connection connected to one end of the first named voltage dividing circuit elements.

5. An arc welding system for supplying a direct current to a welding arc struck between a consumable electrode and a spaced work member, comprising a three phase welding transformer having a pair of three phase wye connected secondaries, each having a neutral point connected to the neutral point of the opposite secondary and having three phase control windings, one for each phase, six controlled rectifiers connected one each in series with each phase winding of the secondaries to a common welding output terminal, and being similarly polarized to conduct with respect to said terminal and each having a firing terminal, three firing circuits each including the firing terminals of the phase related rectifiers and a capacitor, a current control transistor and a unijunction transistor connected to provide a discharge circuit to the capacitor when the charge thereon reaches a selected level, full wave rectifiers connected one each to each of the control windings and connected to the phase related trigger circuit to provide a charging current to the related capacitor, the charging rate being determined by the related current control transistor, firing control circuit including a control transformer having a center tapped secondary and a pair of rectifying elements oppositely connected to opposite ends of the transformer, a series of resistors connected between the center tap and the rectifying elements, at least one of said resistors including an adjustable tap connected to a common input terminal, means to connect the common input terminal to the firing circuits to similarly bias said transistors, and a feedback voltage divider connected across the welding output terminals and having an output terminal connected to the center tap connection of the control transformer.

6. The system of claim 5 having a pair of diodes connected between the first adjustable tap and the voltage divider to limit the voltage at the first adjustable tap to a selected maximum value.

7. An arc welding system for supplying a direct current to a welding arc struck between a consumable electrode and a spaced work member and having a three phase welding transformer having a delta connected primary and a pair of three phase wye connected secondaries, each having a neutral point connected to the neutral point of the opposite secondary, an inductor connected to a center point of the interphase transformer and constituting a welding output terminal, six controlled rectifiers connected one each in series with each phase winding of the secondaries to a second common welding output terminal being similarly polarized to conduct with respect to said second terminal and having a firing terminal, three firing circuits each including a pulsing transformer having a primary and a secondary connected to the firing terminals of the phase related rectifiers, each of said firing circuits including a capacitor in series with the pulsing primary, a current control transistor and a unijunction transistor connected to provide a discharge circuit to the capacitor when the charge thereon reaches a selected level, each of said firing circuits further including an emitter follower transistor having an output connected to the current control transistor and having a balancing resistor in the emitter circuit and having a common input connection to all three of the emitter follower transistors, full wave rectifiers connected one each to each of the control windings and connected to the phase related trigger circuit to provide a charging current to the related capacitor, the charging rate being determined by the related current control transistor, a firing control circuit including a control transformer having a center tapped secondary and a pair of rectifying elements oppositely connected to opposite ends of the transformer, a series of resistors in parallel with a voltage regulating means to provide a reference voltage and connected between the center tap and the rectifying elements, at least on said resistors including an adjustable tap connected to a common input terminal to all three of the emitter follower transistors, a feedback voltage divider connected across the welding output terminals and having an output terminal connected to the center tap connection of the control transformer, and a pair of diodes connected between the first adjustable tap and the voltage divider to limit the voltage at the first adjustable tap to a selected maximum value.

8. An arc welding system for supplying a direct current to a welding arc struck between a consumable electrode and a spaced work member, comprising a three phase welding transformer having a delta connected primary and a pair of three phase wye connected secondaries, each having a neutral point connected to the neutral point of the opposite secondary and having three phase control windings, one for each phase control winding, one for each phase, an inductor connected to a center point of the interphase transformer and constituting a welding output terminal, six silicon controlled rectifiers connected one each in series with each phase winding of the secondaries to a common welding output terminal, said rectifiers each having a cathode connected to the output terminal and thereby being similarly polarized to conduct with respect to said terminal and having a firing terminal, three firing circuits each including the firing terminals of the phase related rectifiers, each of said firing circuits including a capacitor in series with a pulsing primary, a current control transistor and a unijunction transistor connected to provide a discharge circuit to the capacitor when the charge thereon reaches a selected level, each of said firing circuits further including an emitter follower transistor having an output connected to the current control transistor and having a balancing resistor in the emitter circuit and having a common input connection to all three of the emitter follower transistors, full wave rectifiers connected one each to each of the control windings and connected to the phase related trigger circuit to provide a charging current to the related capacitor, the charging rate being determined by the related current control transistor, a firing control circuit including a control transformer having a center tapped secondary and a pair of rectifying elements oppositely connected to opposite ends of the transformer, a series of resistors in parallel with a Zener diode to provide a reference voltage connected between the center tap and the rectifying elements, two of said resistors each including an adjustable tap, a first of which is connected to a common input terminal to all three of the emitter follower transistors, a feedback voltage divider connected across the welding output terminals and having an output terminal connected to the center tap connection of the control transformer, a pair of diodes connected between the first adjustable tap and the voltage divider to limit the voltage at the first adjustable tap to a selected maximum value, a current transformer coupled to one pair of phase lines of the welding transformer between the secondaries, and a voltage doubler circuit connected across the current transformer and having an output means connected between the second adjustable tap and the end of the corresponding resistor to back bias the reference signal appearing at the first adjustable tap.

References Cited
UNITED STATES PATENTS

| | | |
|---|---|---|
| 2,859,399 | 11/1958 | Sommeria. |
| 2,958,817 | 11/1960 | Kaiser et al. _____ 321—26 |
| 3,069,614 | 12/1962 | Steinert et al. _____ 315—141 X |
| 3,113,259 | 12/1963 | Walker _____ 321—26 X |

JAMES W. LAWRENCE, *Primary Examiner.*

C. R. CAMPBELL, *Examiner.*